No. 869,566. PATENTED OCT. 29, 1907.
F. W. HAWKES.
RIPRAP.
APPLICATION FILED MAY 29, 1906.
2 SHEETS—SHEET 2.
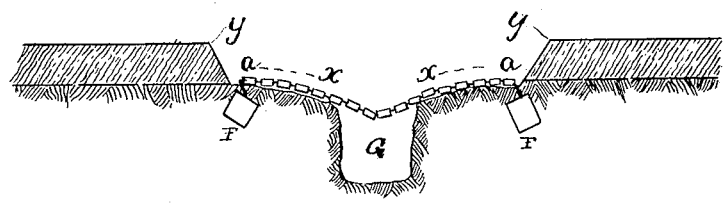
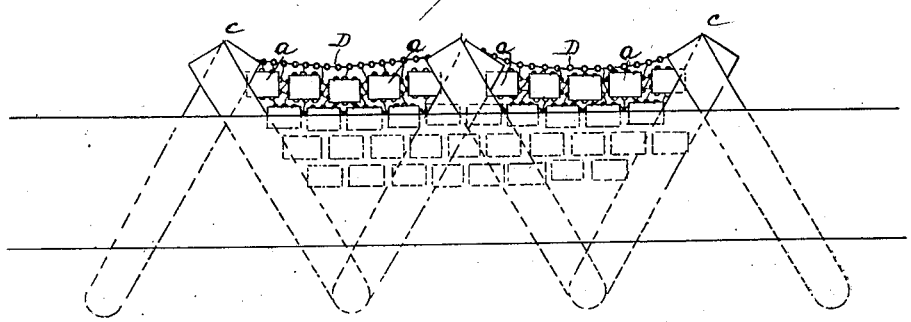
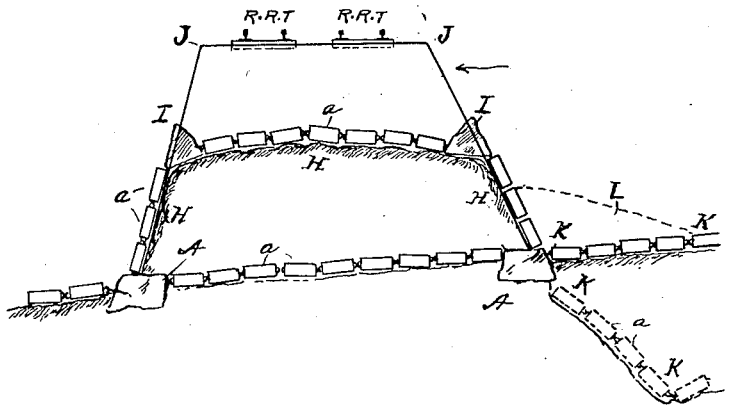
WITNESSES
INVENTOR

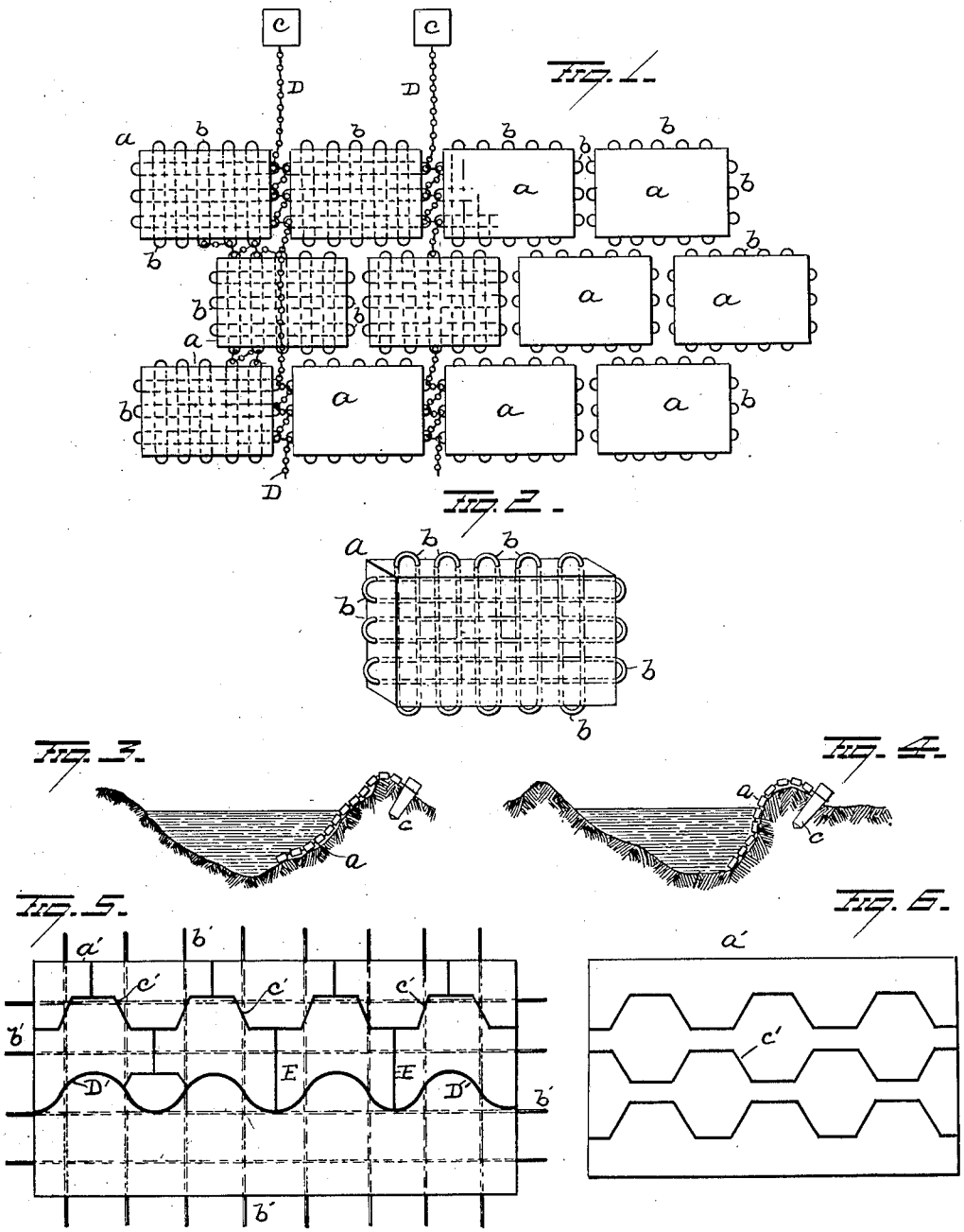

UNITED STATES PATENT OFFICE.

FREDERIC W. HAWKES, OF NEW YORK, N. Y.

RIPRAP.

No. 869,566.   Specification of Letters Patent.   Patented Oct. 29, 1907.

Application filed May 29, 1906. Serial No. 319,320.

*To all whom it may concern:*

Be it known that I, FREDERIC W. HAWKES, a resident of New York, in the county of New York and State of New York, have invented certain new and useful Improvements in Ripraps; and I do hereby declare the following to be a full, clear, and exact description of the invention, such as will enable others skilled in the art to which it appertains to make and use the same.

My invention relates to improvements in rip raps, for the control or restraint, within fixed bounds, of water courses of every description, both permanent and of temporary character, or of bodies of water, such as ponds, reservoirs, lakes, or of the ocean itself, the object of the invention being to provide a flexible, resistant covering, for the protection of such exposed places as may be subject to damage through water, also to provide an efficient apron of water resisting materials, for the purpose of diverting currents of water into suitable channels, or to retard the flow of water, or to control the movement of water in volume in any desired manner.

A further object is to provide a flexible, resistant covering for the protection of sub-marine caissons, or tunnels, or for the protection of sub-marine pipes, cable, or other sub-marine work, or for dams, or for the bridging over of quick sands, sloughs, or marshes.

A further object is to provide a cheap and efficient break water, against the action of waves or currents, and to provide a suitable bottom for aqueducts and ditches across deposits of gravel or other porous ground.

With these and other objects in view the invention consists in certain novel features of construction and combinations and arrangements of parts as will be more fully hereinafter described and pointed out in the claims.

In the accompanying drawings, Figure 1 is a view in elevation illustrating one form of my improved riprap. Fig. 2 is a view of one of the units of the rip-rap and Figs. 3, 4, 5, 6, 7, 8 and 9, are views illustrating modifications and the application of my improvements.

$a$ represents a unit of the rip-rap, which comprises a block of material, such as concrete, asphaltum, artificial stone, cement, rubber, or other material or composition adapted to resist the action of water. This block may be of any desired shape, size and thickness, and its specific gravity may be greater or less than water, as may be required.

$b$—$b$, indicate metal rods, bands, plates, chains, cables, or fiber strands, which are passed through the block $a$, both longitudinally and laterally, not only for the purpose of strengthening the block itself, but also affording sufficient tensile strength to sustain the weight of several of such blocks when attached together. These devices $b$—$b$ on the respective blocks $a$ may be attached to each other as shown in Fig. 1, preferably by means of a heavy wire, rod, chain, cable, or rope D, woven through the loops formed at the ends of $b$—$b$, to tie the blocks together and to the supporting chains or cables D. It is obvious that the blocks can be secured together in various other ways to render the connection between the blocks flexible. The result will be a single layer of blocks of any desired extent secured firmly together, yet with a narrow opening between all the blocks. It now becomes obvious that if this arrangement of secured blocks be laid down upon or suspended from, an embankment which it is desired to protect, and should then be firmly anchored at its uppermost side to suitable anchors $c$, that should the embankment become undermined in any way by the action of the water, then will the rip-rap being flexible and supported from the top forming an apron, permit the lower folds of the apron to settle down and adjust itself automatically to the new contour now presented, thus forming a protecting wall against further encroachment.

Fig. 1 shows one method of arranging blocks to form protective apron; Figs. 3 and 4 illustrate a method of utilizing the rip rap in which it will be observed that the rip rap will follow the contour of the bank as it forms. The action of ordinary rip rap under the above circumstances would be to fall entirely away from the exposed embankment, thus leaving it without protection; while the rip rap itself being discharged to the bottom of the stream, would tend to pile the channel and obstruct the current, increasing the danger of overflow and damage. Furthermore should it be desired to deflect a current of water to confine its flow to a certain channel, an apron formed of flexible rip rap may be suspended from spiles or other support in such manner as to regulate and direct the current, or should it not be practicable on account of insecure bottoming to erect supports, then the riprap aprons may be suspended from cables attached to more distant supports, or a series of barges or floats may be anchored in position and the riprap apron lowered therefrom and held suspended.

In localities where a continuous rip rap or water resisting apron with open spaces between the blocks is required, a continuous mesh formed of wires, expanded metal or chains, cables ropes etc. may be provided and blocks of water resisting materials may be molded thereon, or attached thereto at suitable intervals as shown in Fig. 5, thus forming a rip rap apron of the same general character as the block riprap first described except that in the case last named the blocks are built upon a continuous tensile mesh instead of singly as in the first named case.

The object of an open space between the water resisting blocks, is first, to insure flexibility of the riprap apron; second to equalize the water pressure upon the rip rap apron, third, to regulate the flow of water through the rip-rap, and fourth to permit solid matter such as sand, etc., to be carried through the interstices in the rip-rap apron and then deposited through retardation of the current, inducing the precipitation of the suspended particles, at the back of the rip rap apron.

Where it is desired to supply flexible rip rap of a character practically impervious to water, then as an alternate to the block system above described, a tensile mesh may be provided and incorporated into a continuous flexible sheet formed of any water resisting material capable of yielding to pressure without being readily ruptured.
Where it is essential that the rip rap apron be of especially heavy construction and at the same time flexible enough to adjust itself to uneven surfaces and to yield to impact, of dirt, ice, etc., without rupture, the tensile mesh should be embedded nearest that surface of the riprap apron, least exposed to pressure while the exposed side may be scored out in such manner as to cause lines of weakness which will develop under pressure in such manner as to enable the rip rap apron to yield without rupture as shown in Figs. 5 and 6. In these figures $a^1$ illustrates the covering of cement on the wires $b^1$ and $c^1$. D and E show lines of weakness of various shapes which may be varied as desired. Should it be desired to further strengthen the rip rap apron an additional "tensile mesh" may be incorporated within the rip rap apron upon its exposed side and additional reinforcement may be provided either within the rip rap apron or exterior thereto yet secured to same.

In places where flexible rip rap is provided for shore protection it is advisable to curve the rip rap into the shore at suitable intervals, thus forming a revetment sufficiently deep to prevent the currents from working in around ends of same.

In the protection of submarine works as well as to secure a proper foundation for a right of way across quicksands, sloughs lands or quagmires, continuous flexible rip rap may be laid down over the point to be protected or filled upon and carried thence to higher ground, or to a point or points, where it may be securely anchored as shown in Fig. 7. It is obvious that if the flexible rip rap $a$—$a$ is carried across the slough G and is of sufficiently strong construction, the fills $y$—$y$ (Fig. 7) may be extended across the bed thus formed. The extension of the fills from either shore will still further anchor the rip rap apron to the points $x$ so that the apron from $x$ to $x$ will be the more firmly supported. The same idea may be carried out in the protection of submarine tunnel work. Where deemed advisable the outer area of connected or continuous flexible rip rap may be of massive construction to serve as anchorage while the inner blocks or apron may be of light construction, the whole reinforced with specially heavy tensile mesh in order to sustain the greater loads.
For the construction of aqueducts or irrigating ditches across gravel or other porous soils, continuous flexible rip rap may be provided along the bottom and sides of the ditch forming a water tight trough for the passage of the water. Continuous flexible rip rap is also designed to be used as a protection from inroads by the ocean and through the control of ocean currents to assist in scouring out the channel in harbors and contrariwise to control the formation of made land by inducing a deposit of sand and to prevent encroachment upon the shore by waves tides or currents. Continuous rip rap is also adapted for the construction of breakwaters for harbors, etc., as shown in Fig. 8.

The limited amount of material required for the constructions of flexible rip rap as compared with rip rap in general use, the ease with which the materials may be transported, assembled for use and applied, together with the flexibility and strength of the rip rap apron thus formed, renders this form of construction peculiarly valuable for the protection of dams, levee or railroad embankments, of the bottoms and embankments of canals and other works exposed to the action of water and for the expeditious repairs of same.

Fig. 9 shows section of a fill formed upon a bed lined with flexible rip rap. At the points A—A, especially strong key blocks are provided, preferably with a metal core—such as a chain, cable etc. The fill marked by the line H—H—H, is then carried up from A—A. The rip rap apron is then constructed over the fill H—H—H, the key blocks at I—I as at A—A should be made especially strong since the lines of strain to which these blocks are subjected meet here at an angle. The blocks I—I are preferably formed in such manner that loose earth, gravel, etc., may be carried if desired, to a higher point such as J—J. If desired the flexible apron may then be attached at one block I and carried over the point J—J and attached at the other block I. The arrow indicates the exposed side of the embankment or levee. K—K indicates rip-rap attached at A and the dotted lines indicate where this rip-rap K—K, if undermined will find lodgment. L represents a limited quantity of loose ballast deposited which will assist in carrying the rip rap K—K to its lower conformation.

Flexible rip rap aprons of the general character previously described may be utilized in the construction of fortifications and in effecting repairs of same, also in effecting temporary repairs of the exposed decks, sides, etc., of war vessels. For the last named purpose, individual blocks of the character described in Fig. 1 may be used as ballast until required and can then be readily assembled. The resulting flexible apron while offering resistance to the enemies' fire, will at the same time form a netting to prevent damage from splinters. For purposes of army or navy use the materials with which the tensile mesh is reinforced are preferably fire resisting and of a character to withstand intense heat. For purposes of warfare also, a protective deck composed of flexible rip rap may be constructed upon scows, barges, etc., and draped to a point alongside, below the water line. If desired, open spaces where provided between the blocks, may be closed by means of flexible metal strips, canvas, or other materials, secured over the exposed tensile mesh, the object being to prevent the passage of solid particles or of water between the units yet at the same time to preserve the flexible character of the rip rap apron, taken as a whole.

A great many other changes might be made in the general form and arrangement of the parts described without departing from my invention. Hence, I do not restrict myself to the precise details set forth but consider myself at liberty to make such slight changes and alterations as fairly fall within the spirit and scope of my invention.

Having fully described my invention what I claim as new and desire to secure by Letters-Patent, is:—

1. A rip-rap comprising a series of units spaced apart, and flexible devices connecting said units, each unit provided with metal pieces extending through and beyond the same and constituting attaching means for the flexible devices.

2. A rip-rap comprising a series of units spaced apart, and flexible devices connecting said units, each unit provided with two metal pieces extending through and beyond the same, one of said metal pieces disposed longitudinally of the unit and the other metal piece disposed transversely thereof.

3. A unit for a rip-rap, comprising a block having two series of wires embedded therein and projecting therefrom, one series of wires disposed longitudinally of the block and the other series disposed transversely of the same.

In testimony whereof, I have signed this specification in the presence of two subscribing witnesses.

FREDERIC W. HAWKES.

Witnesses:
L. E. HICKS,
W. A. CARROLL.